(12) United States Patent
Bordoni (10) Patent No.: US 10,598,039 B2
(45) Date of Patent: Mar. 24, 2020

(54) DEVICE FOR THE INDIVIDUAL ADJUSTMENT OF A PLURALITY OF VARIABLE-PITCH RADIAL STATOR VANES IN A TURBOMACHINE

(71) Applicant: SAFRAN AIRCRAFT ENGINES, Paris (FR)

(72) Inventor: Nils Bordoni, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 258 days.

(21) Appl. No.: 15/550,998

(22) PCT Filed: Feb. 9, 2016

(86) PCT No.: PCT/FR2016/050272
§ 371 (c)(1),
(2) Date: Aug. 14, 2017

(87) PCT Pub. No.: WO2016/132041
PCT Pub. Date: Aug. 25, 2016

(65) Prior Publication Data
US 2018/0030849 A1    Feb. 1, 2018

(30) Foreign Application Priority Data

Feb. 19, 2015   (FR) ...................................... 15 51442

(51) Int. Cl.
*F01D 17/16*    (2006.01)
(52) U.S. Cl.
CPC ...... *F01D 17/162* (2013.01); *F05D 2220/323* (2013.01); *F05D 2230/72* (2013.01);
(Continued)

(58) Field of Classification Search
CPC ...... F01D 17/162; F01D 17/16; F01D 17/167; F05D 2220/323; F05D 2230/72;
(Continued)

(56) References Cited

U.S. PATENT DOCUMENTS 2,924,375 A * 2/1960 McKissock ........... F01D 17/162
415/149.4
3,861,822 A * 1/1975 Wanger ................. F01D 17/162
415/147

(Continued)

FOREIGN PATENT DOCUMENTS

| FR | 2688827 A1 | 9/1993 | |
|---|---|---|---|
| GB | 2479064 A * | 9/2011 | ........... F01D 17/162 |
| WO | WO-2012104366 A1 * | 8/2012 | ........... F01D 17/165 |

OTHER PUBLICATIONS

Written Opinion of the International Searching Authority dated Apr. 26, 2016, issued in corresponding International Application No. PCT/FR2016/050272, filed Feb. 9, 2016, 4 pages.

(Continued)

*Primary Examiner* — Woody A Lee, Jr.
*Assistant Examiner* — Brian Christopher Delrue
(74) *Attorney, Agent, or Firm* — Chirstensen O'Connor Johnson Kindness PLLC (57) ABSTRACT

A device for adjusting the pitch of at least one annular row of stator vanes for a turbine engine module. The device includes a first control ring mounted to rotate freely about an axis of the turbine engine. The device also includes connecting rods for connecting the first control ring to the vanes and a second control ring mounted to rotate freely about the axis. Each vane of the at least one row is simultaneously connected to the first and second control rings by a set of at least two connecting rods. The device is suitable for use as part of a module and is suitable for use in a turbine engine.

14 Claims, 7 Drawing Sheets

(52) U.S. Cl.
CPC ...... *F05D 2240/12* (2013.01); *F05D 2250/40* (2013.01); *F05D 2250/42* (2013.01); *F05D 2260/50* (2013.01); *Y02T 50/671* (2013.01)

(58) Field of Classification Search
CPC ............. F05D 2240/12; F05D 2250/40; F05D 2250/42; F05D 2260/50; Y02T 50/671; F04D 29/563
See application file for complete search history.

(56) References Cited

U.S. PATENT DOCUMENTS

| | | | | | |
|---|---|---|---|---|---|
| 4,254,619 | A | * | 3/1981 | Giffin, III | F02K 3/075 244/55 |
| 4,400,135 | A | * | 8/1983 | Thebert | F01D 17/162 415/134 |
| 4,546,606 | A | * | 10/1985 | Bouiller | F01D 17/162 137/601.05 |
| 4,773,817 | A | * | 9/1988 | Stangalini | F01D 11/001 415/127 |
| 5,387,080 | A | * | 2/1995 | Bouhennicha | F01D 17/162 415/150 |
| 5,692,879 | A | * | 12/1997 | Charbonnel | F01D 17/162 415/159 |
| 5,993,152 | A | * | 11/1999 | Schilling | F01D 17/162 415/155 |
| 7,037,070 | B2 | * | 5/2006 | Raine | F01D 17/162 415/149.4 |
| 7,413,401 | B2 | * | 8/2008 | Szucs | F01D 17/162 415/160 |
| 8,690,521 | B2 | * | 4/2014 | Colotte | F01D 17/16 415/149.4 |
| 8,727,697 | B2 | * | 5/2014 | Eifert | F01D 17/162 415/1 |
| 8,784,043 | B2 | * | 7/2014 | Bouru | F04D 29/563 415/160 |
| 9,476,362 | B2 | * | 10/2016 | Patsouris | F01D 9/065 |
| 9,885,291 | B2 | * | 2/2018 | Lecordix | F02C 9/22 |
| 2006/0263206 | A1 | * | 11/2006 | Bouru | F01D 17/162 415/159 |
| 2010/0080684 | A1 | * | 4/2010 | Colotte | F01D 17/16 415/36 |
| 2010/0158662 | A1 | * | 6/2010 | Colotte | F01D 17/16 415/33 |
| 2010/0158663 | A1 | * | 6/2010 | Colotte | F01D 17/16 415/33 |
| 2011/0184573 | A1 | * | 7/2011 | Colotte | F01D 17/16 700/287 |
| 2014/0075956 | A1 | * | 3/2014 | Patsouris | F01D 9/065 60/785 |
| 2016/0069275 | A1 | * | 3/2016 | Lecordix | F02C 9/22 415/1 |

OTHER PUBLICATIONS

International Preliminary Report on Patentability dated Aug. 22, 2017, issued in corresponding International Application No. PCT/FR2016/050272, filed Feb. 9, 2016, 1 page.

Rapport de Recherche Preliminaire, mailed Dec. 18, 2015, issued in corresponding French Application No. 1551442 filed Feb. 19, 2015, 6 pages.

International Search Report dated Apr. 26, 2016, issued in corresponding International Application No. PCT/FR2016/050272, filed Feb. 9, 2016, 2 pages.

Written Opinion of the International Searching Authority dated Apr. 26, 2016, issued in corresponding International Application No. PCT/FR2016/050272, filed Feb. 9, 2016, 5 pages.

* cited by examiner

DEVICE FOR THE INDIVIDUAL ADJUSTMENT OF A PLURALITY OF VARIABLE-PITCH RADIAL STATOR VANES IN A TURBOMACHINE

TECHNICAL FIELD

Embodiments of the present disclosure relate to the field of bypass turbine engines, particularly for aircraft, in which air flows circulate in an upstream to downstream direction. More specifically, it relates to means for adjusting the pitch of fixed vanes configured to deflect axial incident air into a duct of the turbine engine as a function of the flight conditions.

BACKGROUND

Figure 1:
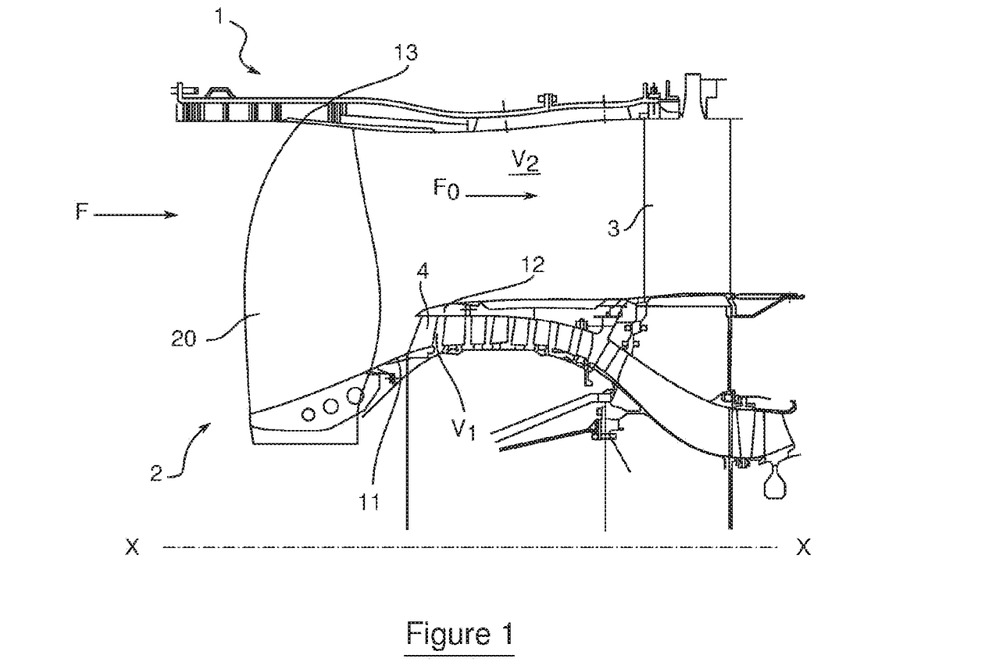
FIG. 1 is a section view of a bypass turbine engine according to the prior art.

Conventionally, with reference to FIG. 1, a turbine engine 1, as disclosed in patent application FR 2902142 by SNECMA, extends axially along an axis X-X and comprises an inner casing 11, an inter-duct casing 12 and an outer casing 13 so as to delimit a primary duct V1 between the inter-duct casing 12 and the inner casing 11 and a secondary duct V2 between the inter-duct casing 12 and the outer casing 13. In other words, the secondary duct V2 and the primary duct V1 are annular and are separated by the inter-duct casing 12.

The turbine engine 1 comprises a rotary shaft, which upstream comprises a movable fan 2 for compressing an incident air flow F, the movable fan 2 comprising radial vanes 20, the free end of which is facing the outer casing 13 of the turbine engine 1 so as to compress an air flow at least in the secondary duct V2 and, preferably, also in the primary duct V1. Conventionally, the turbine engine 1 is called ducted-fan turbine engine.

The air flow circulating in the primary duct V1 is conventionally compressed by compressor stages of the turbine engine 1 before entering the combustion chamber. The combustion energy is recovered by turbine stages, which help to drive the compressor stages and the upstream movable fan 2. The air flow circulating in the secondary duct V2 for its part contributes to the thrust of the turbine engine 1.

Conventionally, the secondary duct V2 comprises, downstream of the movable fan 2, fixed radial vanes or stator vanes 3, which are known to a person skilled in the art as "Outlet Guide Vanes (OGV)", to straighten the air flow $F_0$ deflected by the movable fan 2 as it rotates. Similarly, downstream of the movable fan 2, the primary duct V1 comprises fixed radial vanes or stator vanes 4, which are known to a person skilled in the art as "Inlet Guide Vanes (IGV)". A "fixed vane" or "stator vane" is understood to be a vane that is not set into rotation about the axis X-X of the turbine engine 1, i.e. contrary to a movable vane or rotor of a rotor stage of the turbine engine 1.

To improve the performance of this turbine engine, it has been proposed for a plurality of variable-pitch radial stator vanes to be mounted upstream of the movable fan, the variable-pitch radial vanes being configured to deflect axial incident air and the movable fan being configured to axially straighten this deflected air in the secondary duct.

Introducing variable-pitch radial stator vanes particularly allows the performance of the turbine engine to be improved for a set of flight conditions and for its acoustic impact to be reduced. However, the devices for adjusting the variable-pitch of vanes that are already commonly present in turbine engines only allow a uniform variation of the pitch of the vanes. Indeed, each vane is connected to a control ring by a lever or connecting rod. The control ring exerts the same displacement on the end of each lever. Since they are of equal length, all the levers therefore pivot by the same angular amplitude. An example of a variable-pitch stator vane of this type is disclosed in document FR 2688827 by the applicant. However, they do not allow the pitch of the vanes to be dynamically adjusted by azimuth to any lack of homogeneity in the incoming flow.

Therefore, a requirement exists for individually adjusting the pitch of the fixed radial vanes in order to take into account any distortions in the air flow entering the turbine engine, for example due to boundary layer ingestion or due to the presence of side wind. The fact that the pitch of the vanes can be modified individually as a function of their azimuthal position in the turbine engine thus allows the flow entering the fan to be adapted both to the flight conditions (take-off, cruising, even flow reversal mode) and to the external conditions.

However, individual adjustment of each vane, particularly in a stator upstream of a fan, involves multiplying the number of actuators, which reduces the reliability of the system.

The object of the disclosure is to propose a solution for orienting the vanes of a turbine engine stator, in order to straighten the flow passing through the vanes by individually adapting the pitch of the vanes, at least for a certain number of flight conditions and variations of the desired effect as a function of the azimuth of the vanes about the stator axis. Furthermore, the object of the disclosure is to achieve this aim by limiting the complexity of the means that are used.

The proposed solution is particularly, but not exclusively, applicable to the example that is described. For example, it can relate to the adaptation of the pitch of the OGVs as a function of downstream obstructions, to preserve the operability of the turbine engine, or even to the adaptation of the pitch of the vanes of a straightener at the inlet of a compressor. In particular, it can allow the pumping margin of the compressor or fan, placed upstream or downstream of the stator vanes thus controlled, to be increased by more accurately straightening the flow.

SUMMARY

To this end, the disclosure relates to a device for adjusting the pitch of at least one annular row of stator vanes for a turbine engine module, the device comprising individually adjusting means adjusting the pitch of the vanes that comprise a first control ring mounted to rotate about an axis of the turbine engine, connecting rods for connecting the first control ring to the vanes and a second control ring mounted to rotate about the axis, each vane of the at least one row being simultaneously connected to the first and second control rings by a set of at least two connecting rods.

By virtue of the variable pitch of the radial stator vanes, the deflection of the incident air flow can be adapted as a function of the requirements of the turbine engine, i.e. its operating state. The system for individually adjusting the pitch of the vanes with at least two control rings allows the pitch of the vanes to evolve according to different rules depending on their azimuthal position. Therefore, the adjustment system has at least two degrees of freedom allowing more accurate optimisation of the aerodynamic criteria, with each control ring corresponding to one degree of freedom.

Advantageously, the number of control rings is limited to two, which limits the complexity of the adjustment and control system and improves reliability. Furthermore, the fact that there are several connecting rods for each vane allows, by changing their geometry, the dependency of the pitch variations on the displacements of the control rings to be adjusted differently for each vane. Such a system can be used, for example, to correct the effects of a side wind or the development of angle of incidence during take-off, by adapting it so that the pitch of each vane evolves according to a relation that is dependent on its azimuthal position by controlling a first ring, whilst maintaining the ability to globally adapt the pitch of the vanes to the flight phases by controlling a second ring. In the case of a bypass turbojet engine, in particular, an improvement in the performance of the straightener upstream of the fan can allow a reduction in the length of the air intake that is commonly arranged to homogenise the secondary flow before the fan propeller. Furthermore, such means for individually adjusting the pitch of the radial vanes provides the possibility of being able to fulfil a speed brake function on the radial stator vanes by placing them in a given pitch position. The turbine engine thus does not require the addition of a thrust reverser on the turbine engine, which reduces its weight and its complexity. By combining this effect with the shortening of the air intake, it is thus possible for the turbine engine nacelle to be significantly shortened.

Preferably, with the connecting rods of the assembly being articulated successively pairwise about substantially radial articulation shafts, a first connecting rod is mounted to rotate about a first and a second substantially radial pivot shaft, the first pivot shaft being mounted on the first control ring and the second pivot shaft being configured to be positioned independent of the position of the first control ring, and a second connecting rod is pivotally mounted on the first connecting rod about a first articulation shaft located at a first distance from the second pivot shaft that is determined for each vane.

Throughout the following description, the term "articulation shaft" for a connecting rod refers to a connecting shaft that pivots with another connecting rod of the set of connecting rods and differentially moves therewith; the term "pivot shaft" for a connecting rod refers to a connecting shaft that pivots with an item outside the set of connecting rods, for example a casing, a vane or a control ring.

This mounting of the first connecting rod pivoting about a shaft independent of the first control ring allows the movement of the first control ring relative to the other pivot shaft of the first control ring to be converted into a movement of the second connecting rod with an amplification factor that is directly linked to the position of its articulation on the first connecting rod. This movement of the second connecting rod then can be transferred to the vane in a manner that is substantially dissociated from the movement of the second ring.

Furthermore, the system of connecting rods can be adapted to the previously described cases of variable-pitch vanes that are one-piece or have a movable flap.

Advantageously, the first articulation shaft is located between the first and second pivot shafts.

Furthermore, this first distance allows an amplification factor of the different pitch variations for each vane to be adjusted as a function of the displacements of the first control ring.

Advantageously, modifiable connection means allow the first articulation shaft to be moved on the first connecting rod during a turbine engine maintenance or set-up operation.

Preferably, for each vane of the at least one row, a pivot connection is arranged to connect the vane to the set of connecting rods about a third substantially radial pivot shaft that is connected to the vane and is offset along the axis of the turbine engine relative to a pitch shaft of the vane.

A pitch shaft is herein understood to be a substantially radial shaft, about which the entire radial vane or a movable flap thereof rotates in order to orient itself according to the pitch angle. This allows, due to a leverage effect, the movement of the fourth connecting rod to be converted into a variation of the pitch angle.

This mounting simply converts the displacement of the third pivot shaft, which is due to a movement of the first or second control ring, into a variation of the pitch of the vane.

According to an embodiment, the second pivot shaft is mounted on a stator casing and a third connecting rod from the set is mounted to rotate about a fourth substantially radial pivot shaft mounted on the second control ring.

The pivoting mounting of the first connecting rod onto the fixed casing provides an amplification ratio that is determined between the movement of the first control ring and the fixed articulation point on this first connecting rod, whereas the articulation between the first connecting rod and the third connecting rod by the second connecting rod provides the degree of freedom that is then necessary in order for the second control ring to be able to act independently on the set of connecting rods.

Advantageously, the fourth pivot shaft is located on the third connecting rod between a second articulation shaft with the second connecting rod and a third articulation shaft with a fourth connecting rod, the fourth connecting rod being pivotally mounted about the third pivot shaft.

In this assembly, interposing the third connecting rod between the first connecting rod and the fourth connecting rod allows the dissociation of the influence of the displacement of the first ring relative to the position of the second ring that drives the fourth pivot shaft on which the third connecting rod pivots. The first control ring thus can be assigned to azimuthal adaptations of the pitch of the vanes, whereas the second ring can activate the third connecting rod in order to adjust the pitch of the vanes by azimuth in a substantially uniform manner as a function of the flight regimes. For example, in the case of a stator upstream of a fan, the first ring can induce pitch variations in the vanes in order to take into account certain variations in lack of homogeneity of the incoming flow by azimuth, for example a side wind.

Preferably, for each vane, the fourth pivot shaft is substantially in the same plane perpendicular to the axis of the turbine engine as a pitch shaft of the vane.

Advantageously, the first and third connecting rods are substantially parallel to the axis of the turbine engine for at least one position of the control rings.

In a still more preferable manner, the second and fourth connecting rods are substantially perpendicular to the axis of the turbine engine for at least one position of the control rings.

In a further embodiment, for at least one vane of the at least one row, the second pivot shaft is mounted on the second control ring and the second connecting rod of the set is pivotally mounted about the third pivot shaft.

In this variant, for example for a stator upstream of a fan, it is the relative displacement of the first ring relative to the second ring that can induce pitch variations that are differentiated as a function of the azimuth of each vane in order to take into account variable lack of homogeneity of the incoming flow, whereas common displacement of the first and second ring can adjust the pitch of the vanes in a substantially uniform manner by azimuth for adaptations that are a function of the flight regime.

Advantageously, in such a device, the sets of connecting rods are arranged so that the ratios between the variation of the pitch angle induced by a unitary displacement of the first control ring and the variation of the pitch angle induced by a unitary displacement of the second control ring are different for at least two of the vanes.

The disclosure further relates to a turbine engine module, comprising at least one annular row of variable-pitch stator vanes, extending substantially radially about an axis of the turbine engine, at least one stator casing extending radially inside or outside the vanes and a device for adjusting the pitch of the at least one annular row of vanes, as previously described.

The disclosure further relates to a turbine engine, characterised in that it comprises at least one device as previously described, or a module as previously described, and it is placed, for example, upstream of a fan, downstream of a fan or inside a compressor.

Advantageously, such a turbine engine does not comprise stator vanes mounted in the secondary duct downstream of the movable fan. The air flow deflected by the movable fan is axially straightened and does not require the presence of downstream radial vanes, which reduces the weight of the turbine engine and reduces its complexity. Similarly, the turbine engine may not comprise stator vanes mounted in the primary duct downstream of the movable fan.

The radial stator vanes that can straighten a flow in a duct are distributed as a ring in straightener modules. It is particularly possible for such straightener modules to be distinguished from structural, non-straightening, modules, which comprise radial arms between the casings, by the following features:
- there are at least twenty radial arms or radial vanes in a straightener module, whereas the structural modules have fourteen radial arms at most;
- if an aerodynamic criterion, called "spacing", is considered that is defined by the ratio of the chord length of the arms or radial vanes over the distance between two adjacent arms or vanes at the head, the value of the "spacing" is greater than 0.8 for a straightener module, whereas it is less than 0.5 for a non-straightener module; and
- the angle of incidence of the radial vanes of a straightener module along the axis of the turbine engine depends on the fan propeller but must be at least 15° in order to have a straightening effect, whilst normally remaining below 65°.

The disclosure further relates to a method for adjusting the pitch of at least one annular row of variable-pitch vanes, using a device as previously described, during a turbine engine maintenance or set-up operation, comprising a preliminary step that comprises determining, for each vane, values of the first distance on the first connecting rod and a second distance that is defined by the gap between the third pivot shaft and an articulation shaft of the connecting rod of the set mounted on the third pivot shaft, the values allowing a given evolution rule to be obtained for the pitch angles as a function of the movement of the positions of the first and the second control ring, which method subsequently comprises a step a) that comprises adjusting the second distance for at least one vane and/or a step b) that comprises adjusting the first distance for at least one vane.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 2:
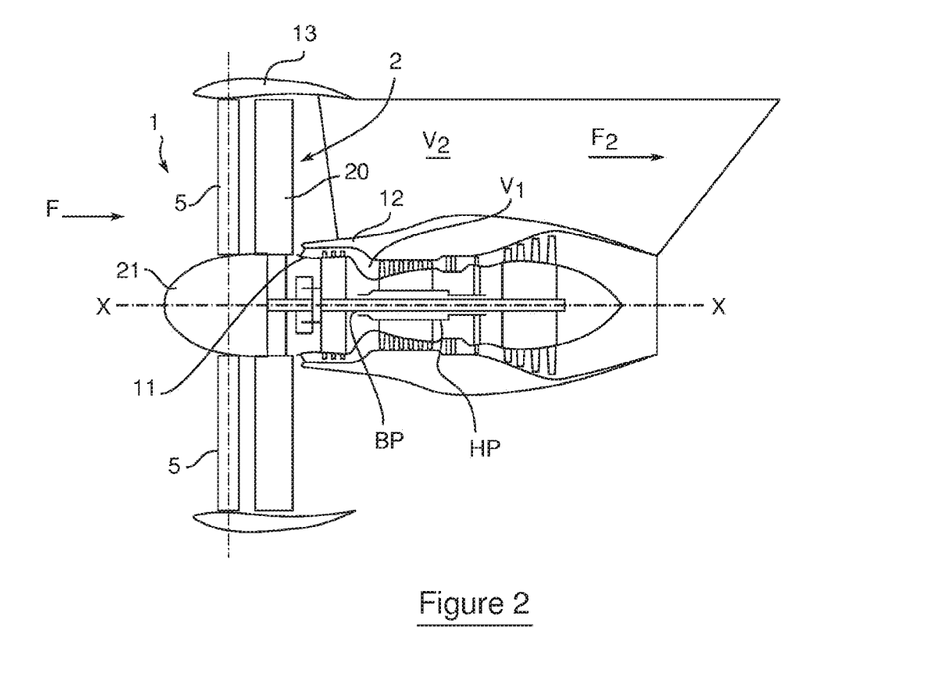
FIG. 2 is a section view of a bypass turbine engine according to the disclosure.

With reference to FIG. 2, which schematically shows a turbine engine according to the disclosure for aircraft, the turbine engine 1 extends axially along an axis X-X and comprises an inner casing 11, an inter-duct casing 12 and an outer casing 13 in order to delimit a primary duct V1 between the inter-duct casing 12 and the inner casing 11 and a secondary duct V2 between the inter-duct casing 12 and the outer casing 13. In other words, the secondary duct V2 and the primary duct V1 are annular and are separated by the inter-duct casing 12.

The turbine engine 1 in this example comprises a low-pressure LP rotary shaft and a high-pressure HP rotary shaft, the low-pressure LP rotary shaft comprising a movable fan 2 upstream that comprises radial vanes 20, the free end of which is facing the outer casing 13 of the turbine engine, so as to compress an incident air flow F at least in the secondary duct V2. In the example of FIG. 2, the movable fan 2 accelerates an air flow in the secondary duct V2 and in the primary duct V1.

The air flow circulating in the primary duct V1 is conventionally compressed by compressor stages before entering the combustion chamber. The combustion energy is recovered by turbine stages that drive the compressor stages and the upstream movable fan 2. For its part, the air flow circulating in the secondary duct V2 helps to provide the thrust for the turbine engine 1. In this example, the turbine engine 1 has a high bypass ratio, i.e. more than 15.

According to the disclosure, the turbine engine 1 comprises a plurality of fixed radial vanes or stator vanes 5 mounted upstream of the movable fan 2 in order to deflect the axial incident air F before it is axially straightened by the movable fan 2 in the secondary duct V2, as shown in FIG. 2. By way of an example, the turbine engine comprises at least twenty circumferentially distributed radial stator vanes 5. With reference to FIG. 2, the radial stator vanes 5 extend in the same plane transverse to the axis of the turbine engine 1, between the inner casing 11 and the outer casing 13 of the turbine engine 1, so as to completely deflect the axial incident flow F received by the turbine engine 1.

In this example, the turbine engine 1 comprises, upstream of the fan 2, a fixed axial cone 21, which is rigidly connected to the inner casing 11 and in which the plurality of radial stator vanes 5 is mounted. Preferably, the axial distance between the plurality of radial stator vanes 5 and the movable fan 2 is between 0.1 and 10 times the average chord of a radial stator vane in order to optimise the straightening. Advantageously, this allows the distance to be reduced between the radial stator vanes 5 and the movable fan 2, so as to form a more compact turbine engine. Furthermore, due to the compactness of the turbine engine 1, it can integrate a smaller nacelle instead of the outer casing 13, i.e. the fan casing.

Figure 3:
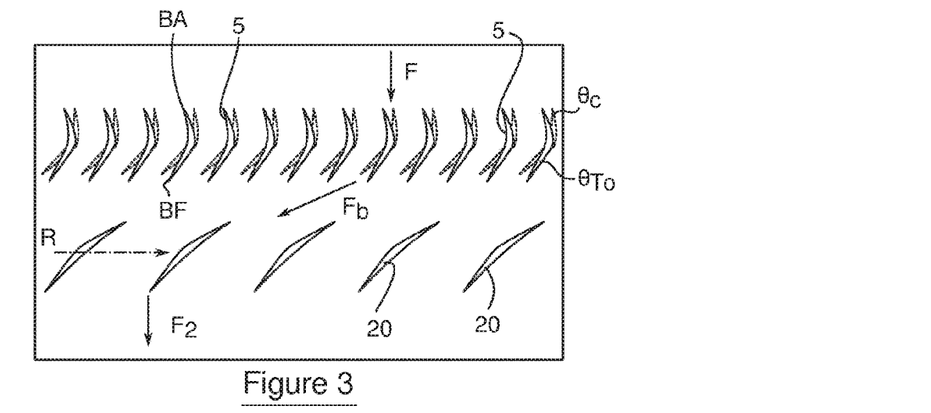
FIG. 3 is a schematic section representation of the radial stator vanes during take-off.

According to the disclosure, the presence of radial stator vanes 5 upstream of the fan 2 allows the incident air flow F to be deflected before it is compressed by the movable fan 2. Indeed, as shown in FIG. 3, the plurality of radial stator vanes 5 mounted upstream of the movable fan 2 allows the incident air flow F to be deflected so that the deflected air flow Fb comprises an axial and tangential component. Subsequently, the deflected air flow Fb is axially straightened by the movable vanes 20 and is compressed so that the air flow F2 circulating in the secondary duct V2 is oriented axially, as shown in FIG. 3. Advantageously, the air flow F2 output from the fan 2 largely only comprises one axial component.

In this example, each radial stator vane 5 has a preferably three-dimensional, extended shape that extends in a radial direction. Each radial stator vane 5 has a substantially constant chord over its length. Preferably, each radial stator vane 5 comprises an aerodynamic body having a leading edge BA and a trailing edge BF so as to, on the one hand, deflect any incident air flow F received by the radial stator vane 5 and, on the other hand, to continuously accelerate the incident air flow in order to maintain a laminar flow. Preferably, the profile allows the incident air flow to accelerate on at least 75% of the chord of the vane.

The radial stator vane 5 comprises a root mounted in the inter-duct casing 12 and a head mounted in the outer casing 13 by screw and nut type connection means, but clearly other connection means also can be suitable.

Figure 4:
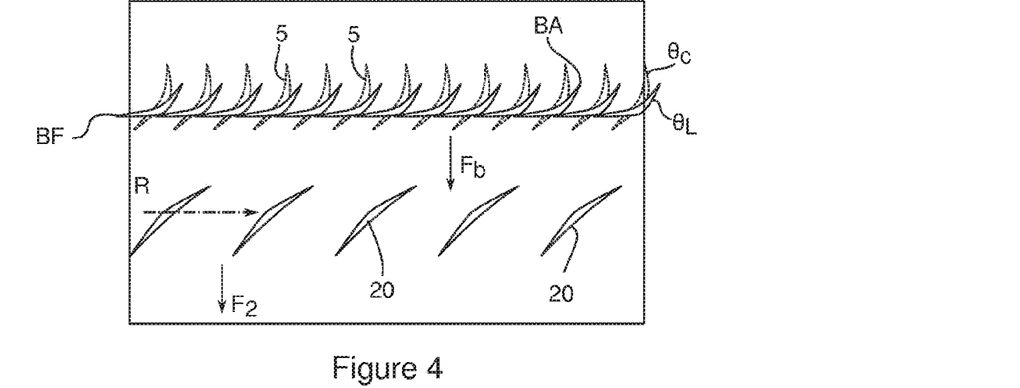
FIG. 4 is a schematic section representation of the radial stator vanes during thrust reversal.

According to the disclosure, the radial stator vanes 5 are variable-pitch vanes in order to allow optimal deflection of the incident air flow F for any operating state of the turbine engine (take-off TO FIG. 3), cruising C (FIG. 3) or braking L (FIG. 4)). Variable-pitch is understood to be the orientation of the stator vane 5 or part of the stator vane 5 about a substantially radial pitch shaft 33. Furthermore, the terms upstream and downstream are herein understood in relation to the direction of the main flow in the turbine engine along its longitudinal axis X-X.

According to one aspect of the disclosure, it comprises techniques or means configured for individually adjusting the pitch of the radial stator vanes 5 in order to allow the pitch to be adapted as a function of the configuration of the turbine engine 1, for example, when a mast 6 is present downstream of the movable fan. These means for individually adjusting the pitch of the vanes are controlled in order to adaptively realise the pitch of the radial stator vanes 5 so that the air flow F2 circulating in the secondary duct V2 extends axially in order to limit any pumping phenomena in the turbine engine.

Figure 5A:
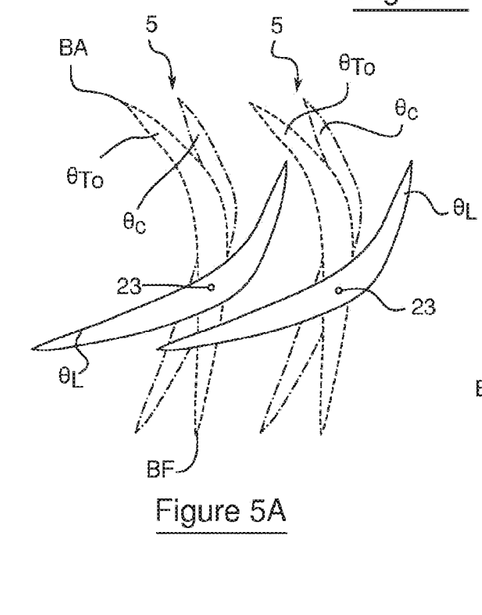
FIG. 5A is a schematic representation of a plurality of pitch positions of a one-piece radial stator vane according to the disclosure comprising a movable body.

According to a first embodiment of the variable-pitch stator vanes, each radial stator vane 5 comprises a one-piece movable body rotating about a radial pitch shaft 23 FIG. 5A). Thus, depending on the operating state of the turbine engine 1, the entire radial stator vane 5 orients about the pitch shaft 23 along which it extends, so as to be set according to the pitch angles for cruising $\theta_c$, for take-off $\theta_{TO}$ or when slowing down $\theta_L$.

Figure 8:
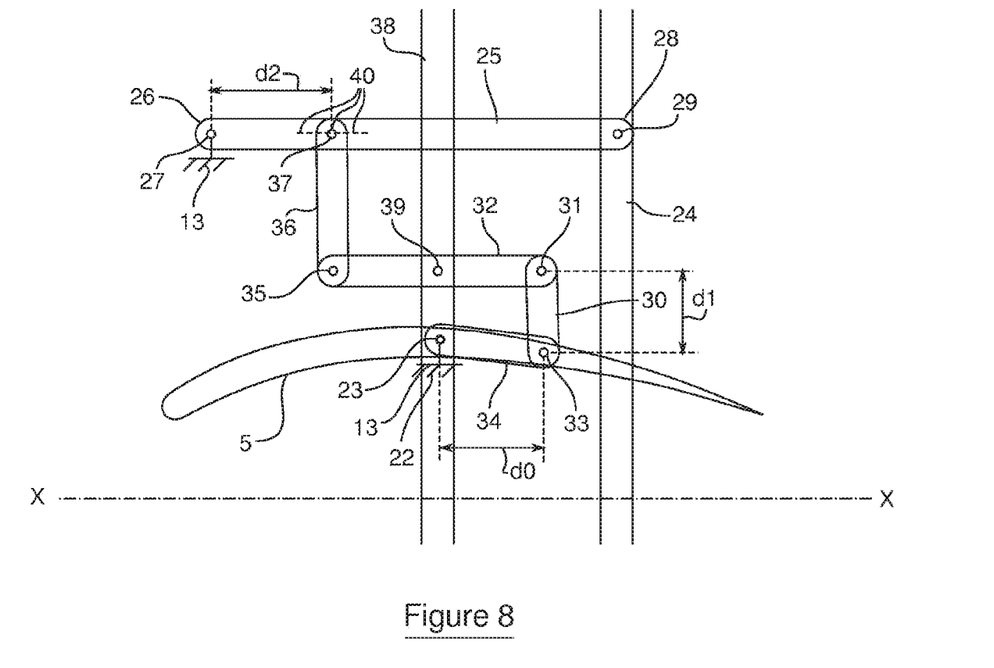
FIG. 8 is a schematic representation, viewed radially from above, of a first embodiment of a radial stator vane and means for adjusting its pitch according to the disclosure.
Figure 12:
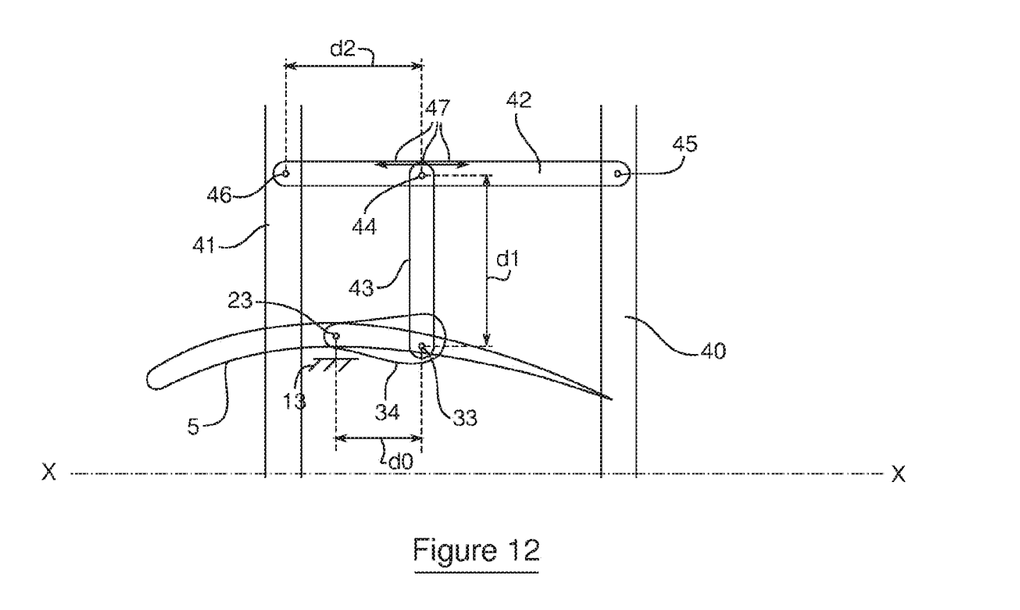
FIG. 12 is a schematic representation, viewed radially from above, of a second embodiment of a radial stator vane and means for adjusting its pitch according to the disclosure.

In this embodiment, with reference to FIG. 8 and FIG. 12, each radial stator vane 5 is thus mounted to rotate about a substantially radial pitch shaft 23 on a pivot means 22 rigidly connected to the outer casing 13, the pitch shaft 23 in this case opening out radially on the outside of the casing 13. The pitch shafts 23 of the radial vanes 5 are located in the same plane perpendicular to the longitudinal axis X-X of the turbine engine.

In this first embodiment, the means for individually adjusting the pitch of the radial stator vanes 5 are preferably located on one of the fixed structures, the outer casing 13 or the fixed axial cone 21, holding the vanes 5.

A preferred embodiment of the means for individually adjusting the pitch of the vanes is described hereafter by locating these means on the outer casing 13, without ruling out the possibility of locating them on the fixed axial cone 21.

With reference to FIG. 8, in this embodiment a first control ring 24 and a second control ring 38 are mounted to freely rotate relative to the axis X-X of the turbine engine, on the outer radial wall of the casing 13. The first control ring 24 is mounted downstream of the pitch shafts 23 of the radial vanes 5, whereas the second control ring 38 in this case is located substantially in the same plane perpendicular to the axis X-X as the pitch shafts 23 of the radial vanes 5.

Furthermore, in this embodiment, each radial vane 5 is simultaneously connected to the control rings 24, 28 by a set of four connecting rods 25, 36, 32 and 30 articulated successively together pairwise in a pivoting manner about substantially radial articulation shafts 37, 35, 31, 33.

A first connecting rod 25 is mounted, in the vicinity of one of its ends 28, to rotate about a first pivot shaft 29 that is substantially radial and is rigidly connected to the first control ring 24 and, in the vicinity of its other end 26, to rotate about a second pivot shaft 27 that is substantially radial and is mounted on the radially outer wall of the outer casing 13.

The first pivot shaft 29 can be, for example, a pin 29 inserted into a longitudinal slot at the end 28 of the connecting rod 25. In this way, when the first control ring 24 rotates, the displacement of the pin 29 can set the connecting rod 25 into rotation about the second pivot shaft 27, at its other end 26.

The second pivot shaft 27 of the first connecting rod 25 is offset by azimuth relative to the pitch shaft 23 of the vane 5 and, in this case, upstream thereof.

In this case, the first connecting rod 25 is substantially aligned with the longitudinal axis X-X, thus substantially perpendicular to the first control ring 24, for an average position $\Delta_0$ thereof that corresponds to an average pitch of the vane 5.

A second connecting rod 36 is pivotally mounted on the first connecting rod 25 about a first articulation shaft 37. In this case, the first articulation shaft 37 of the second connecting rod 36 on the first connecting rod 25 is located at a distance d2 from the second pivot shaft 27 of the first connecting rod 25 that places it upstream of the pitch shaft 23 of the radial vane 5.

The second connecting rod 36 is pivotally articulated with a third connecting rod 32 about a second articulation shaft 35 close to one of its ends.

In this case, the third connecting rod 32 is itself pivotally articulated about a third articulation shaft 31, with a fourth and final connecting rod 30.

The fourth connecting rod 30 is pivotally articulated, in the vicinity of the end thereof that is opposite the third articulation shaft 31, about a third pivot shaft 33 mounted on the vane 5. The third pivot shaft 33 is placed at a non-zero distance d0 from the pitch shaft 23 of the vane 5, so as to provide a lever arm that allows the displacement of the fourth connecting rod 30 to be converted into a rotation movement of the vane 5, thus into a modification of its pitch angle θ. This offset can be provided by a connecting rod 34 that is fixed relative to the vane or by any other means. In this case, the third pivot shaft 33 is substantially located on the chord of the vane 5, with this example being by no means limiting. In the example shown, the third pivot shaft 33 is located downstream of the pitch shaft 23 of the radial vane 5.

Furthermore, the third connecting rod 32 is articulated to rotate about a fourth pivot shaft 39 that is substantially radial and is rigidly connected to the second control ring 38. As is the case for the connection of the first connecting rod 25 with the first control ring 24, the fourth pivot shaft 39 can be, for example, a pin 39 inserted into a longitudinal slot of the connecting rod 25. In this way, when the control ring 38 rotates, the displacement of the pin 39 can drive the connecting rod 25 and force it to pivot.

In this case, the fourth pivot shaft 39 substantially passes through the centre of the third connecting rod 32, halfway between the second 35 and third articulation shafts.

In this case, the geometry of the various connecting rods 25, 36, 32, 30 is configured so that, for an average position $G_0$ of the second control ring 38, the first connecting rod 25 being substantially parallel to the axis X-X, the third connecting rod 32 is also substantially parallel to the axis X-X, whereas the second 36 and fourth 30 connecting rods are substantially perpendicular to the axis X-X.

The operation of the adjustment means in response to the displacements A and G of the first 24 and second 38 control rings will now be described, with reference to FIGS. 9A and 9B.

Figure 9A:
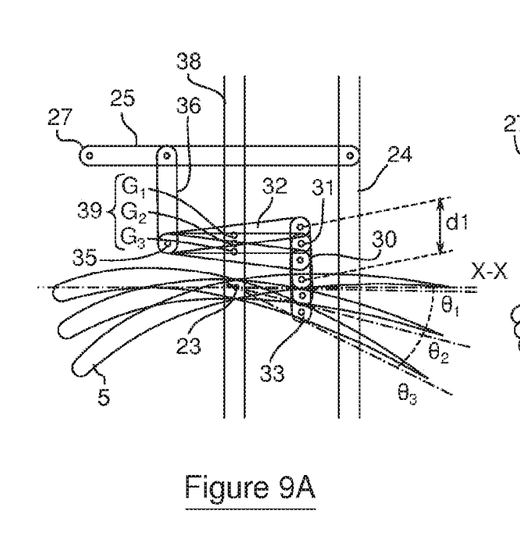
FIG. 9A is a schematic representation of a plurality of pitch positions of a vane shown in FIG. 8 for various displacements of a first control ring.

In FIG. 9A, the first control ring 24 is fixedly held about an average position $\Delta_0$. However, three positions $G_1$, $G_2$, $G_3$ of the second control ring 38 are shown.

In this configuration, the first connecting rod 25 is fixedly held by the first control ring 24 and it holds the second connecting rod 36 in a substantially fixed manner. In these conditions, driving the centre of the third connecting rod 32 by the third pivot shaft 39, which is mounted on the second control ring 38, imposes a rotary movement on this connecting rod about the second articulation shaft 35. In the process of approximating minor movements, this imposes a translation movement on the fourth connecting rod 30 that is perpendicular to the axis X-X, and thus a corresponding displacement of the third pivot shaft 33, rigidly connected to the vane 5, and the positioning of the pitch angle of the vane 5 at three corresponding values $\theta_1$, $\theta_2$ and $\theta_3$.

It is to be noted in this case that, on the third connecting rod 32, the relative position of the second articulation shaft 35 and of the fourth pivot shaft 39 amplifies the movements G of the second control ring 38, in the vicinity of the third pivot shaft 33, on the vane 5. However, for minor movements the dependency of the pitch θ of the vane 5 on the displacements G of the second control ring 38 can be considered to be linear. This can be written as follows:

$$\theta = K \cdot G. \quad (1)$$

It can also be noted at this stage that a first parameter is available for adjusting the control of the pitch of the vane 5 by varying the distance d1 between the third articulation shaft 31 and the third pivot shaft 33 on the fourth connecting rod 30. This distance d1 has an immediate effect, as can be seen from FIG. 8, with respect to the pitch angle θ of the vane 5 for a given position G of the second control ring 38. This distance d1 can be modified, for example, either by changing the fourth connecting rod 30 or by installing connection means on the fourth connecting rod 30 that allow the third pivot shaft 33, for example, to displace thereon.

Depending on the selected length, the origin of the pitch angle θ of the vane 5 is thus displaced. This is expressed as follows to represent the pitch variation as a function of the displacement of the second control ring 38:

$$\theta = K \cdot G + \theta_0. \quad (2)$$

Where $\theta_0$ is the value of the pitch obtained with the length d1 of the second connecting rod 30 for an average position of the control ring 38.

It also can be noted that the length of the second connecting rod 36 could have been adjusted to modify the initial position of the third connecting rod 32 and, therefore, the value $\theta_0$ of the initial pitch.

Figure 9B:
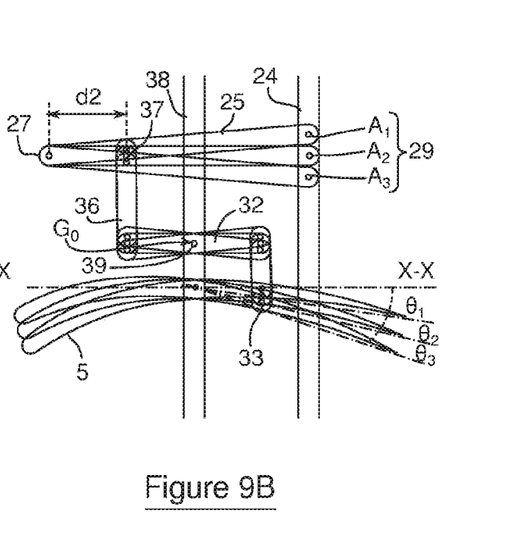
FIG. 9B is a schematic representation of a plurality of pitch positions of a vane shown in FIG. 8 for various displacements of a second control ring.

In FIG. 9B, it is the second control ring 38 that is fixedly held about an average position $G_0$. However, three positions, $A_1$, $A_2$, $A_3$, of the first control ring 24 are shown.

In this configuration, the first connecting rod 25 pivots about the second pivot shaft 27 fixed on the casing 13. Through a leverage effect, the displacement of the first articulation shaft 37 is proportional to the displacement A of the first control ring 24 substantially in terms of the ratio between the distance d2 and the length of the first connecting rod 25. In the process of approximating minor movements, in this case this displacement is perpendicular to the axis X-X.

As the third connecting rod 32 pivots in this configuration about the fourth pivot shaft 39, which is connected to the second control ring 38, the displacement of the first articulation shaft 37 causes a similar displacement, perpendicular to the axis X-X and in the opposite direction, for the third pivot shaft 33, which is connected to the vane 5. In this case, with the third connecting rod 32 substantially rotating at its centre about the fourth pivot shaft 39, which is maintained by the second control ring 38, these movements are symmetrical.

The displacement of the first control ring 24 into three positions, $A_1$, $A_2$, $A_3$, thus causes the pitch of the vane 5 to be positioned at various corresponding values $\theta_1$, $\theta_2$ and $\theta_3$. For minor movements, the dependency of the pitch $\theta$ of the vane 5 on the displacements A of the first control ring can be considered to be linear. This can be written as follows:

$$\theta = Amp \cdot A. \tag{3}$$

Figure 10:
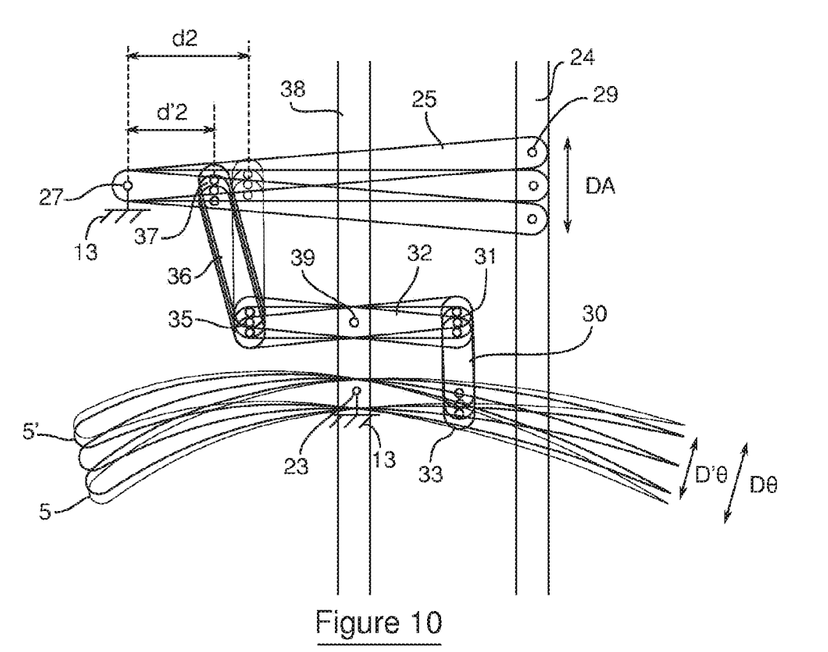
FIG. 10 is a schematic representation of a plurality of pitch positions of a vane shown in FIG. 8 for different geometric parameters in the adjustment means when one of the control rings moves.

It can also be noted at this stage that a second parameter for adjusting the control of the pitch $\theta$ is available by varying, on the first connecting rod 25, the length d2 between the second pivot shaft 27, on the casing 13, and the first articulation shaft 37. Indeed, as previously mentioned, the movement of the first articulation shaft 37, and thus the movement of the third pivot shaft 33 connected to the vane 5, is proportional to this distance d2. The factor Amp in the linear relation between the pitch and the displacement A of the control ring 24 is therefore substantially proportional to this distance d2. FIG. 10 shows this adjustment factor, where it can be seen that the variations D'θ in pitch for the distance d'2 are smaller than the variations DO in pitch for another longer distance d2, with the same displacements DA of the first control ring 24.

One way of adjusting the distance d2 is to use pivoting connection means 47, shown in FIG. 8, that are configured so that the first articulation shaft 37 can be displaced on the first connecting rod 25. For example, this can involve successive holes in the first connecting rod 25, into which an articulation shaft can be inserted for predetermined positions. This can also involve means mounted on a collar clamping the connecting rod 25 for continuous displacement. This can even involve changing the connecting rod 25 as a function of the selected length d2.

Furthermore, in this case the fact that the first connecting rod 25 is substantially parallel to the axis X-X and that the fourth connecting rod 30 is substantially parallel to the control rings 24, 38 for an average control position allows, as a first approximation, the effects of the two parameters d1, d2 to be dissociated for minor movements. Thus, for example, an average pitch $\theta_0$ of the vane 5 can be adjusted by adjusting the length d1 of the fourth connecting rod 30, then adjusting the amplitude Amp of the pitch variations as a function of the displacements A of the first control ring 24, by adjusting the distance d2 on the first connecting rod 25 between the second pivot shaft 27 and the first articulation shaft 37.

Figure 11A:
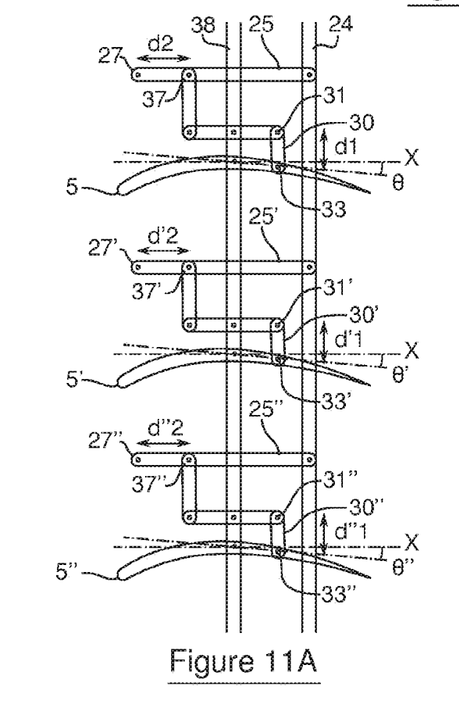
FIG. 11A shows a plurality of successive radial stator vanes equipped with adjustment means, as shown in FIG. 8.

As shown in FIG. 11A, the variable-pitch vanes 5, 5', 5" of the stator can be conventionally organised as a grid. In the configuration that is shown, the geometries of the sets of connecting rods connecting the vanes 5, 5', 5" to the first 24 and second 38 control rings are similar.

For minor movements, it is thus possible to write that the vector $\theta$ of the pitch angles $\theta$, $\theta'$, $\theta''$ of the vanes 5, 5', 5" is a linear function of the two commands A and G, which are the displacements of the two control rings 24, 38:

$$\theta = \theta_0 + K \cdot G + Amp \cdot A \tag{4}$$

If the values of the two parameters d1, d'1, d"1 and d2, d'2, d"2 are adjusted for each connecting rod 5, 5', 5", the coefficients $\theta_0$, K and Amp are vectors with components that can vary as a function of the vane 5, 5', 5". In this case, the components for the vector $\theta_0$ are the values of the initial average pitch $\theta_0$ of each vane 5 for a zero mean value of the displacements of the control rings.

This assembly is particularly warranted if the adjustment of the parameters means that the vectors K and Amp are not collinear. In this case, the two controls are independent and allow the pitch of the radial vanes 5 to evolve according to two degrees of freedom. Therefore, for example, it is possible to contemplate controlling a global pitch of the radial vanes 5 with a command G and controlling azimuth variations around this pitch with the other command A.

Figure 11B:
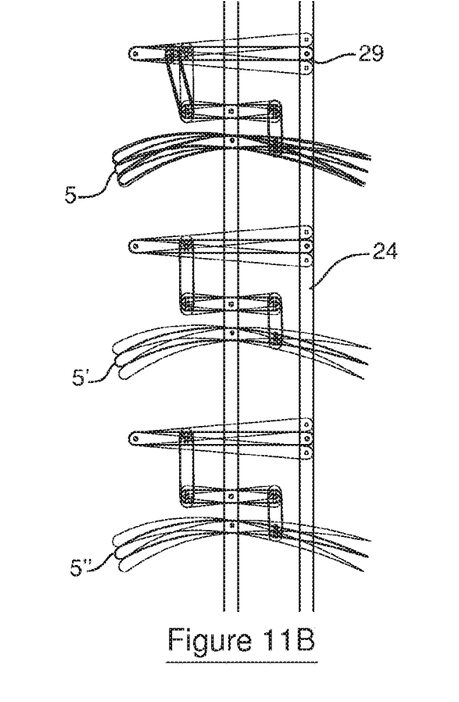
FIG. 11B shows various positions of the vanes of FIG. 11A for various positions of the control rings.

In particular, in the case shown in FIGS. 11A and 11B, the dimensions of the first 25, 25', 25", third 32, 32', 32" and second 36, 36', 36" connecting rods, as well as the positions of the third pivot shafts 33, 33', 33" on the radial vanes 5, 5', 5", are the same. The same is the case for the relative positions of the first 29, 29', 29", second 27, 27', 27", fourth 39, 39', 39" pivot shafts and the pitch shafts 23, 23', 23", for an average position of the first 24 and the second 38 control ring. FIG. 11B shows the differentiated evolutions of the pitch $\theta$, $\theta'$, $\theta''$ of the vanes 5, 5', 5" shown in FIG. 11A.

This first feature in this case means that the factor K between the control of the second ring 38 and the pitch of each vane 5 is the same. By normalising the variables, the vector K can be identified with an identity vector I:

$$\theta = \theta_0 + I \cdot G + Amp \cdot A \tag{5}$$

Furthermore, it has previously been seen, in the process of approximation of minor movements, that there is a direct relation between the initial average pitch $\theta_0$ and the parameter d1, on the one hand, and between the amplification factor Amp and the parameter d2, on the other hand, for each vane 5.

A method for adapting this system, for example, to a turbine engine subject to flight speed variations of the aeroplane on which it is installed, taking into account a side wind, can be carried out simply by associating the second ring 38 with the control of a global pitch of the vanes 5 as a function of the speed and by associating the first ring with the control of azimuthal corrections as a function of the wind direction.

In this case, in order to take into account any constant singularities, during a first step the parameter d1 can be adjusted for each vane in order to define a differentiation of the pitch corrections by azimuth and, in a further step, the parameter d2 can be adjusted for each vane in order to define a vector Amp adapted to the correction of this type of distortion.

For example, for an average position $G_0$ of the second control ring 38, a first position $A_1$ of the first control ring 24 can be defined that corresponds to the differentiated adaptation of the pitch of the vanes to a first type of singularities and a second position $A_2$ of the control ring 24 that corresponds to a second type of singularities. Preferably, these two positions $A_1$ and $A_2$ are selected so that they are close in order to be able to process minor movements. In a still more preferable manner, they are selected around an average position $A_0$, for which the first 25 and fourth 30 connecting rods form a close angle of 90° for the vanes 5, 5', 5" of the stator.

Then, the values of the distances d1, d'1, d"1 and d2, d'2, d"2 are determined for each radial vane 5, 5', 5" supplying the components of the vectors $\theta_0$ and Amp in the formula (5) allowing the desired pitch angles $\theta_1$, $\theta'_1$, $\theta''_1$ to be obtained for the position $A_1$ and $\theta_2$, $\theta'_2$, $\theta''_2$ for the position $A_2$ of the first control ring 24, the second control ring 38 being in the average position $G_0$.

In subsequent steps, the distance d1, d'1, d"1 on the fourth connecting rod 30, 30', 30" and the distance d2, d'2, d"2 on the first connecting rod 25, 25', 25" for each radial vane 5, 5', 5" is adjusted to the previously found values. The term adjustment used herein corresponds either to using adjustment means previously installed on the first 25, 25', 25" and fourth 30, 30', 30" connecting rods or to installing first 25, 25', 25" and fourth 30, 30', 30" connecting rods with the required geometry.

Figure 15:
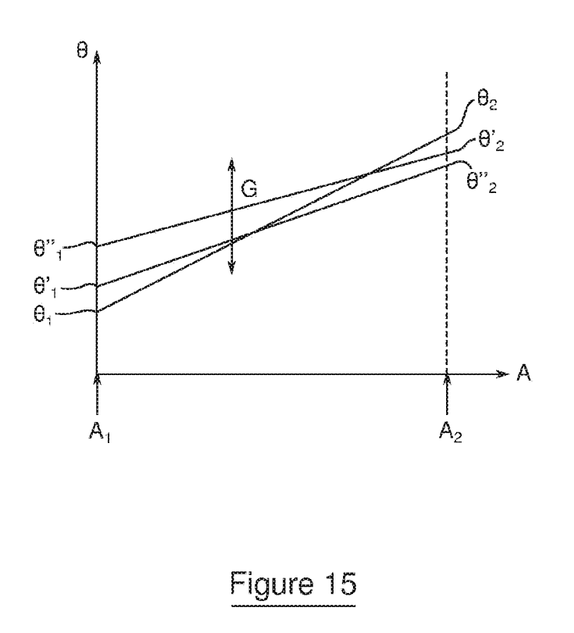
FIG. 15 schematically shows the evolution of the pitch of a plurality of vanes as shown in FIGS. 13A and 13B as a function of the position of the control rings.

When the adjustments are complete, the variations in the pitch angle $\theta$, $\theta'$, $\theta''$ of the vanes 5, 5', 5" correspond to the result shown in FIG. 15 as a function of the position A of the first control ring 24. The displacement G of the second control ring 38 then corresponds to a vertical translation movement of the curves of FIG. 15.

Therefore, the command A of the first ring 24 can be used with positive or negative values depending on the wind direction, whilst maintaining the ability of the command G of the second ring 38 to adapt itself to all the flight phases.

The device can also be used to correct distortions due to the ingestion of boundary layer independent of the flight conditions or operability constraints.

In a variant of an embodiment of the disclosure, shown in FIG. 12, the means for individually adjusting the pitch of the vanes still comprise a first control ring 40 and a second control ring 41 that are mounted to freely rotate relative to the axis X-X of the turbine engine on the radially outer wall of the casing 13. The first control ring 41 is mounted, as before, downstream of the pitch shafts 23 of the radial vanes 5. However, in this case, the second control ring 41 is located substantially upstream of the pitch shafts 23 of the radial vanes 5.

Furthermore, in this second embodiment, each radial vane 5 is connected to the control rings 40, 41 by a set of two connecting rods 42 and 43 articulated together about a first and single articulation shaft 44 for the set of substantially radial connecting rods.

The first connecting rod 42 is mounted, in the vicinity of one of its ends, to rotate about a first pivot shaft 45 that is substantially radial and is rigidly connected to the first control ring 24 and, in the vicinity of its other end, to rotate about a second pivot shaft 46 that is substantially radial and is rigidly connected to the second control ring 41.

For an average position of the two control rings 40, 41, the first connecting rod 42 in this case is substantially parallel to the longitudinal axis X-X and is offset by azimuth relative to the pitch shaft 23 of the vane 5.

The second connecting rod 43 is pivotally mounted, in the vicinity of its end that is opposite the first articulation shaft 44, about a third pivot shaft 33 that is rigidly connected to the vane 5. As in the preceding embodiment, the third pivot shaft 33 is located at a non-zero distance d0 from the pitch shaft 23 of the vane 5 in order to provide a lever arm that allows the displacement of the fourth connecting rod 30 to be converted into a rotary movement of the vane 5, and thus into a modification of its pitch angle $\theta$. In this case, the third pivot shaft 33 is also located substantially on the chord of the vane 5, with this example being by no means limiting. In the example shown, the third pivot shaft 33 is located downstream of the pitch shaft 23 of the radial vane 5.

In this case, the geometry of the various connecting rods 42, 43, as well as the position of the first 45, second 46 and third 33 pivot shafts and of the first articulation shaft 44, is configured so that, for an average position $G_0$ of the second control ring 41, the first connecting rod 42 being substantially parallel to the axis X-X, the second connecting rod 43 is substantially perpendicular to the axis X-X.

The operation of the adjustment means in response to the displacements A and G of the first 40 and second 41 control rings will now be described with reference to FIGS. 13, 14A and 14B.

Figure 13:
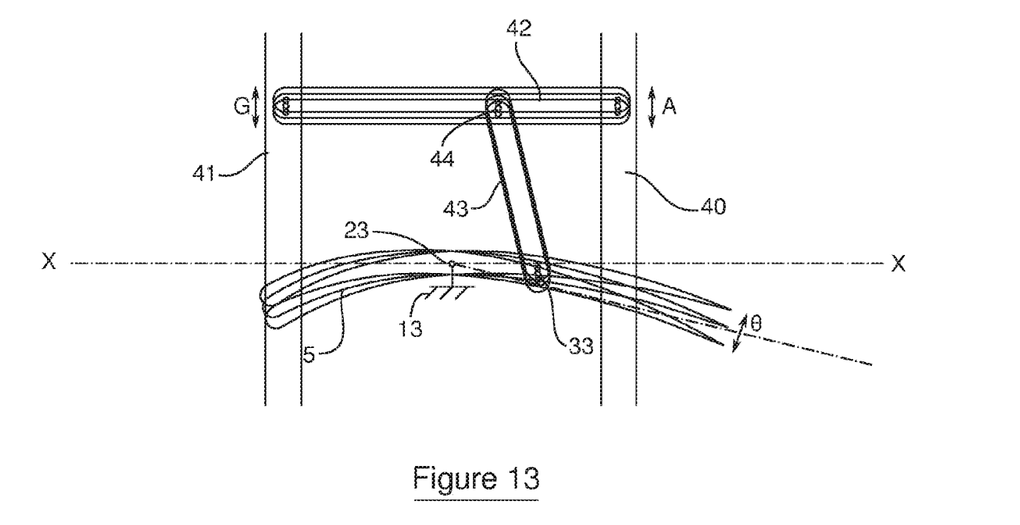
FIG. 13 is a schematic representation of a plurality of pitch positions of a vane shown in FIG. 12 for simultaneous displacements of the control rings.

In FIG. 13, the first control ring 40 and the second control ring 41 move in the same manner.

In this configuration, the first connecting rod 42 and the second connecting rod 43 maintain substantially the same relative position, in the process of approximating minor movements. The common translation movement of positions A and G of the two control rings 40, 41 is therefore expressed by an equivalent translation movement of the third pivot shaft 33 on the radial vane 5, and thus of the position of the pitch angle $\theta$ of the vane 5.

This can be written as follows:

$$\theta = K \cdot (G + A). \tag{6}$$

It can also be noted at this stage that, as before, a first adjustment parameter is available for controlling the pitch of the vane 5 by varying the distance d1 between the third pivot shaft 33 and the first articulation shaft 44 on the second connecting rod 43. This distance d1 has an immediate influence, as can be seen from FIG. 13, on the pitch angle of the vane 5 for a given position A+G of the first 40 and second 41 control rings. This distance d1 can be modified, for example, either by changing the second connecting rod 43 or by installing connection means on the second connecting rod 43 that allow the third pivot shaft 33 to be displaced on the second connecting rod 43, for example.

As a function of the selected length, the origin of the pitch angle $\theta$ of the vane 5 is thus displaced. The variation of the pitch as a function of the displacement of the control rings 40, 41 is written as follows:

$$\theta = K \cdot (G + A) + \theta_0. \tag{7}$$

Where $\theta_0$ is the value of the pitch obtained with the length d1 of the second connecting rod 43 for an average position of the control rings 40, 41.

Figure 14A:
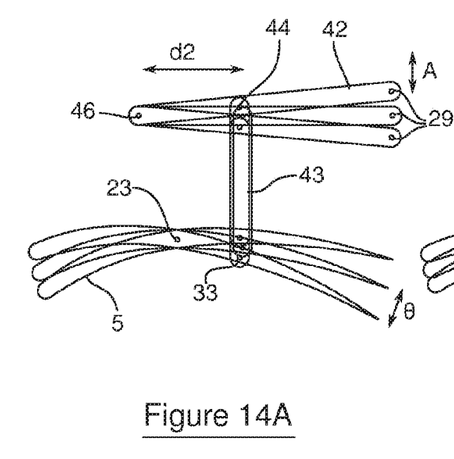
FIGS. 14A and 14B are schematic representations of a plurality of pitch positions of a vane shown in FIG. 12 for various displacements of a first control ring and various connecting rod geometries.
Figure 14B:
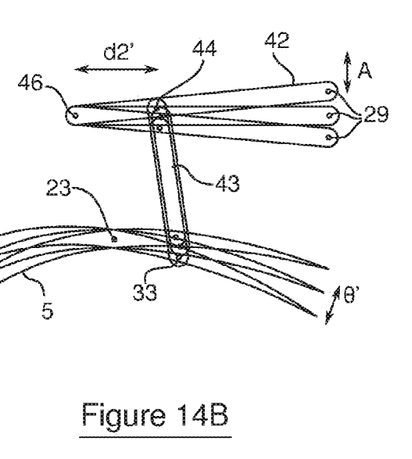

In FIG. 14A, the second control ring 41 is fixedly held about an average position. However, the position A of the first control ring 40 varies.

In this configuration, the first connecting rod 42 pivots about the second pivot shaft 46 fixedly held by the second control ring 41. Through a leverage effect, the displacement of the first articulation shaft 44 is proportional to the displacement A of the first control ring 40 substantially by a factor that is equal to the distance d2 between the second pivot shaft 46 and the first articulation shaft 44, divided by the distance between the first 45 and second 46 pivot shafts. In the process of approximating minor movements, in this case this displacement is perpendicular to the axis X-X.

Therefore, as in the first embodiment, this can be written as follows:

$$\theta = Amp \cdot A. \tag{8}$$

As in the first embodiment, a second parameter for adjusting the control of the pitch $\theta$ is available by varying, on the first connecting rod 42, the distance d2 between the second pivot shaft 46, this time on the second control ring 41, and the first articulation shaft 44. FIG. 14B shows this adjustment factor for a distance d'2 that differs from that of FIG. 14A.

The distance d2 can be adjusted on the first connecting rod by means 47 similar to those used in the preceding embodiment.

In the process of approximating minor movements, the following can therefore be written:

$$\theta = \theta_0 + K(G+A) + Amp \cdot A \qquad (9)$$

Under the same conditions for adjusting the parameters d1 and d2, this embodiment allows, as in the preceding embodiment, the pitch of the radial vanes 5 to be individually modified as a function of two independent degrees of freedom, which in this case are the integral displacement of the two rings 40, 41 and the relative displacement of the first ring 40 relative to the second ring 41.

The two described embodiments provide two ways of dissociating the controls for the two control rings. However, these embodiments are by no means limiting; other geometries, possibly with three successive connecting rods, can allow the radial vanes 5 to be controlled with two degrees of freedom, but with other associations between the commands A and G.

More preferably, the turbine engine 1 comprises means for controlling the pitch of the radial stator vanes as a function of the detection of a distortion in the air flow in the secondary duct V2. Therefore, if the pilot or a computer on board the aircraft, on which the turbine engine is mounted, detects such a distortion, the pilot or the computer can control the control means in order to compensate for this distortion. For example, in the event of distortion in the upstream flow (side wind or boundary layer ingestion), the air flow in the secondary duct V2 downstream of the fan is homogenous by virtue of the adaptation. Such a circumferential adaptive pitch advantageously allows the risks of stalling or pumping the turbine engine 1 to be limited, which improves its performance and its safety.

The pitch of the radial stator vanes 5 can be realised individually or as a group, for example, a plurality of consecutive vanes with the same pitch. In other words, the stator vanes are set "block-by-block".

In this case, with reference to the representations in FIGS. 8 and 12, the sets of connecting rods that have been described for the first or the second variant of an embodiment can be shared by a plurality of successive radial vanes by azimuth. In this case, one of them is connected to the control rings 24, 38 as previously described and it drives the others in a known manner using a connecting rod. This type of implementation can be undertaken by extending the final connecting rod 30 of the set, in order to be able to successively articulate it on the various vanes.

Such a device allows the weight and the complexity of the means for adjusting the pitch of the vanes to be reduced and is particularly useful if the variations in pitch by azimuth are not excessive for the considered vanes.

Figure 5B:
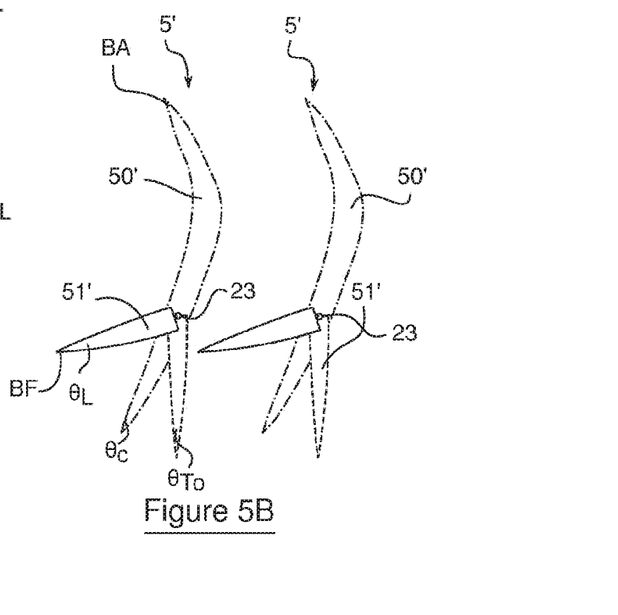
FIG. 5B is a schematic representation of a plurality of pitch positions of a radial stator vane according to the disclosure comprising a fixed body and a movable flap.
Figure 6:
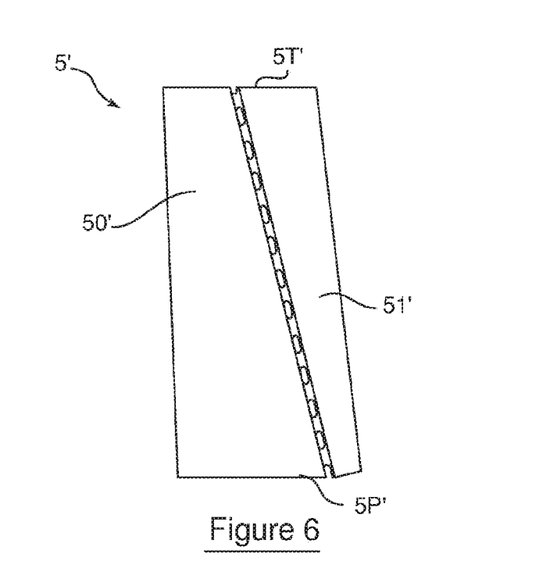
FIG. 6 is a schematic representation of the side of a radial stator vane according to the disclosure comprising a fixed body and a movable flap.

According to a second embodiment, each radial stator vane 5' comprises a fixed body 50' and a movable flap 51', as shown in FIGS. 5B and 6. Preferably, the flap 51' comprises the trailing edge BF of the radial vane 5' and is articulated about a shaft 23 on the body 50' of the vane 5' that remains fixed. In this example, the movable flap 51' has a section that increases in size over its length, as shown in FIG. 6. Preferably, the section increases in size from the root 5P' of the stator vane 5 up to its head 5T', as shown in FIG. 6, so as to allow the secondary duct V2 to be blocked in the pitch position $\theta_L$ upon landing, whilst allowing the primary duct V1 to be supplied.

The embodiments of the aforementioned means for adjusting the variable pitch of the vanes can be adapted to this second embodiment, in which the pitch shaft 33 drives the movable flap 51'. By adjusting the articulations between the connecting rods, the disclosure can be adapted to a rotary shaft of the movable flap 51' that is slightly inclined relative to the radial direction, as shown in FIG. 6.

Figure 7:
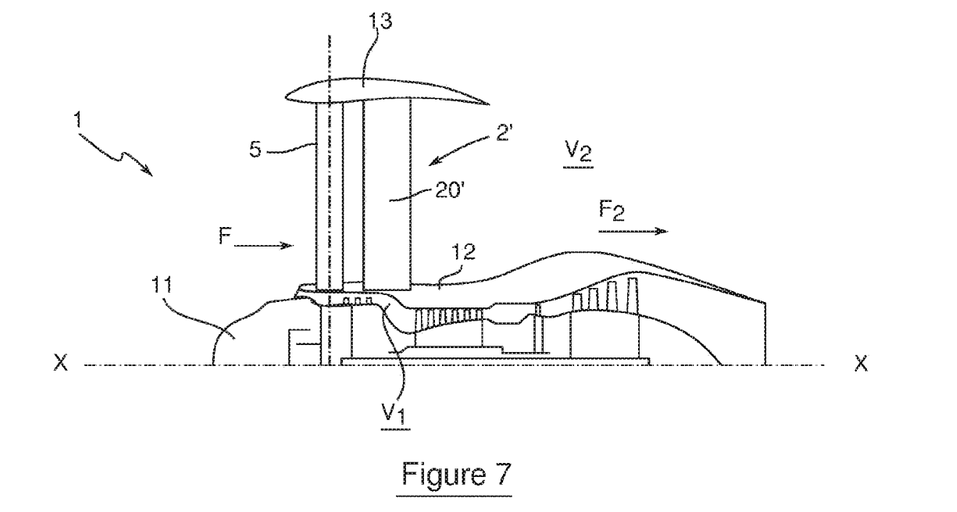
FIG. 7 is a section view of a further embodiment of a bypass turbine engine according to the disclosure.

According to a further embodiment of the disclosure, with reference to FIG. 7, the movable fan 2' comprises movable vanes 20' that radially extend between the inter-duct casing 12 and the outer casing 13 so as to compress an air flow only in the secondary duct V2, the primary duct V1 not receiving an air flow compressed by the movable fan 2'. The result is that the radial stator vanes 5 are mounted between the inter-duct casing 12 and the outer casing 13 in order to deflect the incident air flow F before it is compressed by the movable fan 2'. It is clear that the radial stator vanes 5 can be one-piece or can comprise a movable flap in this configuration of the turbine engine 1.

The embodiment of the means for adjusting the variable pitch of the vanes as described for the first embodiment in this case can be directly transferred by installing these means either on the outer casing 13 or on the inter-duct casing 12.

These examples are by no means limiting, the aforementioned individual adjustment means can thus also be installed, if necessary, to adjust the pitch of radial vanes of a straightener, at the inlet of the primary duct V1, between the inner casing 11 and the inter-duct casing 12, or OGV 3, in the secondary duct V2 downstream of a fan 2.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A device for adjusting the pitch of at least one annular row of stator vanes for a turbine engine module, the device comprising:
   a first control ring mounted to rotate about an axis of the turbine engine;
   a plurality of connecting rods configured for connecting said first control ring to the stator vanes of said at least one annual row of stator vanes; and
   a second control ring mounted to rotate about said axis, wherein each stator vane is simultaneously connected to said first and second control rings by a set of at least two connecting rods of said plurality of connecting rods configured to independently adjust the pitch of said stator vanes.

2. The device according to claim 1, wherein said set of at least two connecting rods being articulated successively pairwise about radial articulation shafts, a first connecting rod of said set of at least two connecting rods is mounted to rotate about a first and a second radial pivot shaft, the first pivot shaft being mounted on said first control ring and the second pivot shaft being configured to be positioned independent of the position of the first control ring, and a second connecting rod of said set of at least two connecting rods is pivotally mounted on the first connecting rod about a first articulation shaft located at a first distance from said second pivot shaft that is determined for each vane.

3. The device according to claim 2, wherein said first articulation shaft is located between the first and second pivot shafts.

4. The device according to claim 2, comprising, for each stator vane of said at least one annular row of stator vanes, a pivot connection arranged to connect said stator vane to said at least two connecting rods about a third radial pivot shaft connected to the stator vane and offset relative to a pitch shaft of said stator vane, along said axis of the turbine engine.

5. The device according to claim 4, wherein said at least two connecting rods includes a third connecting rod, and wherein the second pivot shaft is mounted on a stator casing and the third connecting rod is mounted to rotate about a fourth substantially radial pivot shaft mounted on said second control ring.

6. The device according to claim 5, wherein the fourth pivot shaft is located on the third connecting rod between a second articulation shaft with the second connecting rod and a third articulation shaft with a fourth connecting rod, said fourth connecting rod being pivotally mounted about the third pivot shaft.

7. The device according to claim 5, wherein, for each stator vane, the fourth pivot shaft is substantially in the same plane perpendicular to said axis of the turbine engine as a pitch shaft of the vane.

8. The device according to claim 5, wherein the first and third connecting rods are substantially parallel to said axis of the turbine engine for at least one position of the control rings.

9. The device according to claim 4, wherein, for at least one stator vane, the second pivot shaft is mounted on the second control ring and wherein the second connecting rod is pivotally mounted about the third pivot shaft.

10. A turbine engine module, comprising:
at least one annular row of stator vanes extending substantially radially about an axis of the turbine engine
at least one stator casing extending radially inside or outside the stator vanes; and
a device for adjusting the pitch of said at least one annular row of stator vanes according to claim 1.

11. A turbine engine comprising:
at least one device according to claim 1, wherein said at least one device according to claim 1 is placed upstream of a fan, downstream of a fan or inside a compressor.

12. The device according to claim 1, wherein each stator vane is simultaneously connected to said first and second control rings by a separate set of said at least two connecting rods.

13. A turbine engine module, comprising:
at least one annular row of variable-pitch stator vanes extending substantially radially about an axis of a turbine engine;
at least one stator casing extending radially inside or outside the vanes; and
a device configured to adjust the pitch of said at least one annular row of vanes, said device comprising a first control ring mounted to rotate about an axis of the turbine engine, connecting rods configured for connecting said first control ring to said stator vanes, and a second control ring mounted to rotate about said axis, wherein each stator vane is simultaneously connected to said first and second control rings by at least two of said connecting rods configured to independently adjust the pitch of said vanes;
wherein the module is placed-upstream of a fan, downstream of a fan or inside a compressor.

14. A method for adjusting the pitch of at least one annular row of stator vanes using a device according to claim 5 during a turbine engine maintenance or set-up operation, comprising a preliminary step that comprises determining, for each vane, values of said first distance on the first connecting rod and a second distance that is defined by the gap between the third pivot shaft and an articulation shaft of the connecting rod of said set mounted on said third pivot shaft, said values allowing a given evolution rule to be obtained for the pitch angles as a function of the movement of the positions of the first and the second control ring, which method subsequently comprises a step a) that comprises adjusting the second distance for at least one vane and/or a step b) that comprises adjusting the first distance for at least one vane.

* * * * *